(12) United States Patent
Robinette

(10) Patent No.: US 8,532,858 B1
(45) Date of Patent: Sep. 10, 2013

(54) MULTI-SPEED HYBRID POWERTRAIN WITH SERIES AND PARALLEL OPERATING MODES

(75) Inventor: Darrell Lee Robinette, Brighton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/474,900

(22) Filed: May 18, 2012

(51) Int. Cl.
*B60L 9/00* (2006.01)

(52) U.S. Cl.
USPC .............................................. 701/22; 701/99

(58) Field of Classification Search
USPC ...................................................... 701/22, 99
See application file for complete search history.

(56) References Cited

U.S. PATENT DOCUMENTS

| | | | | |
|---|---|---|---|---|
| 5,841,201 A * | 11/1998 | Tabata et al. | ................ | 290/40 C |
| 6,203,468 B1 * | 3/2001 | Nitta et al. | .......................... | 477/5 |
| 6,480,767 B2 * | 11/2002 | Yamaguchi et al. | ............ | 701/22 |
| 7,131,510 B2 * | 11/2006 | Mesiti et al. | ................ | 180/65.25 |
| 7,351,265 B2 * | 4/2008 | Vitale et al. | ................ | 180/65.51 |
| 7,823,670 B2 * | 11/2010 | Noiret | .......................... | 180/65.29 |
| 7,891,450 B2 * | 2/2011 | Soliman et al. | ........... | 180/65.265 |
| 2006/0048516 A1 * | 3/2006 | Tenbrock et al. | ................ | 60/698 |
| 2007/0068714 A1 * | 3/2007 | Bender | .......................... | 180/65.4 |
| 2007/0265749 A1 * | 11/2007 | Fitzgibbons | .................... | 701/37 |
| 2008/0125928 A1 * | 5/2008 | Conlon et al. | ................... | 701/22 |
| 2008/0223635 A1 * | 9/2008 | Noiret | .......................... | 180/65.2 |
| 2008/0300743 A1 * | 12/2008 | Conlon et al. | ................... | 701/22 |

OTHER PUBLICATIONS

Paul, Multi-Speed Transmissions for Electric Vehicle Applications, Cenex Low Carbon Vehicle Event, Sep. 8, 2011, Corby, Northamptonshire, England.

* cited by examiner

*Primary Examiner* — Hussein A. Elchanti
(74) *Attorney, Agent, or Firm* — Quinn Law Group, PLLC

(57) ABSTRACT

A hybrid powertrain has a prime mover with a drive member and a multi-speed transmission with an input member and an output member. A first motor/generator is continuously connected for common rotation with the drive member. A second motor/generator is continuously connected for common rotation with the input member. A damper is connected with the input member, and a damper clutch is selectively engageable to connect the first motor/generator and the drive member for common rotation with the second motor/generator and the input member through the damper. The hybrid powertrain includes a controller operatively connected to the motor/generators and the damper clutch. The controller is configured to establish at least a hybrid series operating mode and a hybrid parallel operating mode.

20 Claims, 4 Drawing Sheets

| | C1 | B1 | B2 | | | |
|---|---|---|---|---|---|---|
| 1 | | | X | 1.926 | | 3.037 |
| 2 | X | | | 1.000 | 1.93 | |
| 3 | | X | | 0.634 | 1.58 | |
| R1 | | | X | -1.926 | | |
| R2 | X | | | -1.000 | | |
| R3 | | X | | -0.634 | | |

|   | BB1 | BB2 | CC1 | CC2 | CC3 |
|---|---|---|---|---|---|
| R | X | X |   |   | X |
| 1 | X | X |   |   |   |
| 2 | X | X |   | X |   |
| 3 |   | X | X | X |   |
| 4 |   | X |   | X | X |
| 5 |   | X | X |   | X |
| 6 |   |   | X | X | X |
| 7 | X |   | X |   | X |
| 8 | X |   |   | X | X |

MULTI-SPEED HYBRID POWERTRAIN WITH SERIES AND PARALLEL OPERATING MODES

TECHNICAL FIELD

The present teachings generally include a hybrid powertrain with a multi-speed transmission.

BACKGROUND

Hybrid powertrains for vehicles utilize different power sources under different vehicle operating conditions. In a hybrid electric powertrain, the different operating modes are established by controlling the engine and one or more electric motor/generators. The various operating modes may include hybrid operating modes, an electric-only operating mode, and an engine-only operating mode. The availability of different operating modes can be advantageous. For example, the different modes may be implemented as needed to improve fuel economy.

SUMMARY

A hybrid powertrain is provided that includes a prime mover having a drive member. In one embodiment, the prime mover may be an engine, although other prime movers may also be used. The hybrid powertrain has a multi-speed transmission with an input member and an output member. A first motor/generator is continuously connected for common rotation with the drive member. A second motor/generator is continuously connected for common rotation with the input member. As used herein, two components are "connected for common rotation" when their mechanical interconnection necessarily causes them to rotate at the same speed, which maybe a zero speed (stationary). A damper is connected with the input member, and a damper clutch is selectively engageable to connect the first motor/generator and the drive member for common rotation with the second motor/generator and the input member through the damper.

The hybrid powertrain includes a controller operatively connected to the motor/generators and the damper clutch. The controller is configured to establish at least a hybrid series operating mode and a hybrid parallel operating mode. The hybrid series operating mode is established when the prime mover is on, the damper clutch is disengaged, the first motor/generator is controlled to function as a generator, and the second motor/generator is controlled to function as a motor. The hybrid parallel operating mode is established when the prime mover is on, the damper clutch is engaged, and the first and second motor/generators are controlled to function as motors. Multiple fixed speed ratios of the multi-speed transmission enable the speed of the second motor/generator to be reduced when transmission shifts occur, enabling use of a smaller and more efficient motor/generator, and allowing the motor/generators to operate in speed and torque ranges in which the motor/generators are more efficient.

The above features and advantages and other features and advantages of the present teachings are readily apparent from the following detailed description of the best modes for carrying out the present teachings when taken in connection with the accompanying drawings.

DETAILED DESCRIPTION

Figure 1:
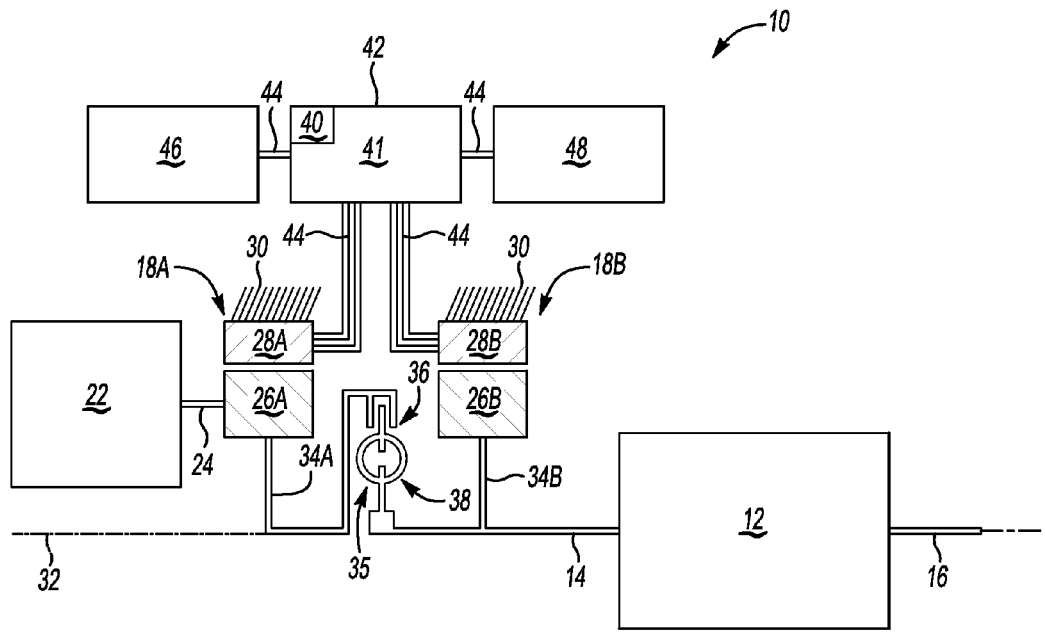
FIG. 1 is a schematic illustration in partial cross-sectional view of a hybrid powertrain including a multi-speed transmission.

Referring to the drawings, wherein like reference numbers refer to the same or like components, FIG. 1 shows a multi-speed hybrid powertrain 10. As explained herein, the hybrid powertrain 10 is referred to as a multi-speed hybrid powertrain because it includes a multi-speed transmission 12 operable to provide multiple fixed speed ratios of an input member 14 of the transmission 12 to an output member 16 of the transmission 12. The transmission 12 can be any multi-speed transmission, such as a multi-speed dual clutch transmission, a multi-speed planetary transmission, a multi-speed manual transmission, or a multi-speed automatic transmission. The multiple fixed speed ratios allow a first motor/generator 18A and second motor/generator 18B to be relatively small in size and power due to the ability of the transmission 12 to multiply torque or increase speed, as desired. Additionally, the powertrain 10 can be operated in multiple hybrid operating modes, an electric-only operating mode, or in non-hybrid (fixed) operating modes.

The powertrain 10 includes a prime mover 22 having a drive member 24. The prime mover 22 can be an internal combustion engine, such as a spark ignition or compression ignition engine. In those instances, the drive member 24 is a crankshaft.

The first motor/generator 18A has a rotor 26A continuously connected for common rotation with the drive member 24. The first motor/generator 18A also has a stator 28A radially surrounding the rotor 26A and fixed to a stationary member 30 such as a motor housing or a transmission casing. The second motor/generator 18B has a rotor 26B continuously connected for common rotation with the input member 14. The second motor/generator 18B also has a stator 28B radially surrounding the rotor 26B and fixed to the stationary member 30 or to a different stationary member. The motor/generators 18A, 18B are schematically illustrated in partial cross-sectional view, showing only a portion of each of the motor/generators 18A, 18B that is above the axis of rotation 32 of the rotors 26A, 26B. As will be understood by those skilled in the art, the rotors 26A, 26B and the stators 28A, 28B are generally annular and surround an axis of rotation 32, with the rotors 26A, 26B rotatable about the axis of rotation 32. The motor/generators 18A, 18B are coaxial with one another, as they have the same axis of rotation 32.

A damping mechanism 35 includes a damper clutch 36 and a damper 38, such as torsional springs. A rotor hub 34A of the rotor 26A is connected to rotate commonly with one side of a damper clutch 36. A rotor hub 34B of the rotor 26B is connected to rotate commonly with the input member 14 and with the damper 38. The damper clutch 36 is selectively engageable to connect the rotor 26A of the first motor/generator 18A and the drive member 24 for common rotation with the rotor 26A of the second motor/generator 18B and the input member 14. The damping mechanism 35 is shown only in partial cross-sectional view, but generally surrounds the axis of rotation 32.

An electronic controller 40 is included with a power inverter 41 in a power inverter module 42 and is connected to the stators 28A, 28B with transfer conductors 44. The transfer conductors 44 carry electric current to and from each of the stators 28A, 28B depending on whether the controller 40 controls each of the stators 28A, 28B to operate as a motor or as a generator. An energy storage device 46, such as a battery or battery module, is connected with transfer conductors 44 to the power invertor 41. The power inverter 41 changes direct current provided from the energy storage device 46 to alternating current provided to the stators 28A, 28B to power one or both of the motor/generators 18A, 18B to function as motors, and can change the alternating current provided from the stators 28A, 28B to direct current for storage in the energy storage device 46 when one or both of the motor/generators 28A, 18B function as generators.

An electrically powered hydraulic pump 48 is connected to the controller 40 and power inverter 41 to receive electric power in order to pump hydraulic fluid to the damper clutch 36 and to selected torque-transmitting mechanisms included in the multi-speed transmission 12 to establish various operating modes. The electrically powered hydraulic pump 48 is used when torque-transmitting mechanisms within the transmission 12 are wet, multi-plate clutches. In other embodiments, the torque-transmitting mechanisms may be dry or mechanical clutches, such as dog clutches, engaged by high pressure oil or engagement mechanisms such as shift forks, or can be actuated electro-mechanically, such as by servo motors.

Specifically, an electric-only operating mode is established when the prime mover 22 is off, the first motor/generator 18A is off, the damper clutch 36 is disengaged, and the motor/generator 18B is controlled to function as a motor, receiving power from the energy storage device 46. The multi-speed transmission 12 can be controlled according to a predetermined clutch engagement schedule stored in the controller 40 or in a separate transmission controller (not shown) operatively connected to the controller 40 to establish all available fixed speed ratios between the input member 14 and the output member 16 during the electric-only operating mode.

A hybrid series operating mode is established when the prime mover 22 is on, the damper clutch 36 is disengaged, the first motor/generator 18A is controlled to function as a generator, and the second motor/generator 18B is controlled to function as a motor. The prime mover 22 can be controlled by the same controller 40 or by a separate controller (not shown) in communication with the controller 40. In the hybrid series operating mode, torque provided by the prime mover 22 to the motor/generator 18A is converted to electrical energy which is transferred from the stator 28A to the stator 28B through the power inverter module 42 to power the rotor 26B to provide torque at the input member 14. The hybrid series operating mode can be referred to as a range-extending mode, as it can be established following the electric-only operating mode when the state of charge of the energy storage device 46 reaches a predetermined minimum. With the prime mover 22 used to power the motor/generator 18B to function as a motor, the driving range of a vehicle is extended beyond the driving range available based only on power from the energy storage device.

During the hybrid series operating mode, various fixed speed ratios between the input member 14 and the output member 16 can be established by engaging different torque-transmitting mechanisms within the multi-speed transmission 12. By utilizing the available speed ratios through the transmission 12, the speed at the output member 16 increases as desired while allowing the speed of the motor/generator 18A or 18B to step down when the transmission 12 is shifted to a higher gear with a lower speed ratio. That is, the speed of the motor/generators 18A, 18B need not continuously increase as vehicle speed increases over the entire range of vehicle speeds.

A hybrid parallel operating mode is established when the prime mover 22 is on, the damper clutch 36 is engaged, and the first and second motor/generators 18A, 18B are controlled to function as motors. The torque of the motor/generators 18A, 18B is combined at the input member 14, and the multi-speed transmission 12 can be controlled to establish any available fixed speed ratio, thereby permitting the speeds of the motor/generators 18A, 18B to be reduced when the transmission 12 is shifted to a higher gear with a lower speed ratio.

A prime mover-only operating mode that is neither hybrid nor electric is established when the prime mover 22 is on, the damper clutch 36 is engaged, and both motor/generators 18A, 18B are off. When the prime mover 22 is an engine, this operating mode is referred to as an engine-only operating mode. The multi-speed transmission 12 can be controlled to establish any available fixed speed ratios as desired, thereby providing torque multiplication or speed multiplication, as desired, depending on the speed ratios available, permitting the speed of the prime mover 22 to be reduced when the transmission 12 is shifted to a higher gear with a lower speed ratio.

The multi-speed transmission 12 can be configured to provide a reverse speed ratio from the input member 14 to the output member 16 by engaging a certain torque-transmitting mechanism or combination of torque-transmitting mechanisms. The powertrain 10 can thus provide reverse propulsion at the output member 16 during any of the hybrid series operating mode, the hybrid parallel operating mode, the electric-only operating mode, and the prime mover-only operating mode by establishing the reverse speed ratio of the multi-speed transmission 12 during the given mode.

A regenerative braking mode can be established by controller 40 in the hybrid powertrain 10 by engaging the damper clutch 36, and controlling at least one of the motor/generators 18A, 18B to operate as a generator to slow rotation of the input member 14 and thereby the output member 16. Controlling the motor/generator 18A to function as a generator to capture regenerative braking energy as described is available only in operating modes in which the damper clutch 36 is engaged. An alternative regenerative braking mode can be established when the damper clutch 36 is disengaged and the second motor/generator 18B is controlled to function as a generator, slowing the input member 14 and thereby the output member 16, such as during the electric-only or the hybrid series operating mode.

Figure 2:
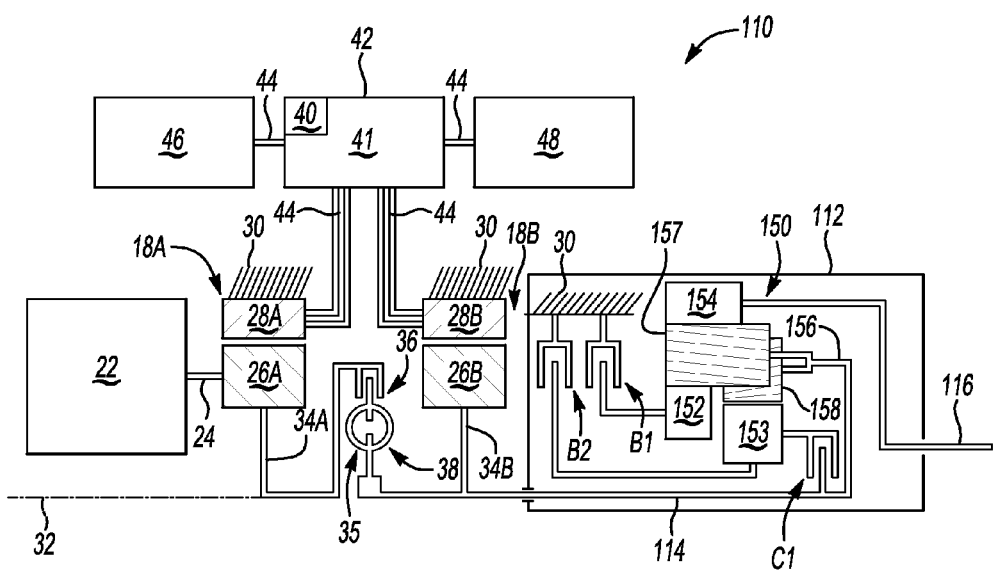
FIG. 2 is a schematic illustration in partial cross-sectional view of a hybrid powertrain including a multi-speed transmission in accordance with an alternative aspect of the present teachings.

FIG. 2 shows another hybrid powertrain 110 within the scope of the present teachings. Components in the hybrid powertrain 110 that are identical to those of the hybrid powertrain 10 are indicated with like reference numbers. In the hybrid powertrain 110, a multi-speed transmission 112 includes an input member 114 connected for common rotation with the rotor 26B. The multi-speed transmission 112 includes a Ravigneaux gear set 150 that has a ring gear member 154 connected for common rotation with an output member 116, a first sun gear member 152, a second sun gear member 153, and a carrier member 156. The carrier member 156 is connected for common rotation with the input member 114 and rotatably supports a first set of pinions 157 and a second set of pinions 158. Only one pinion of each set of pinions 157, 158 is shown. The first set of pinions 157 meshes with the ring gear member 154 and with the first sun gear member 152. The second set of pinions 158 meshes with the first set of pinions 157 and with the second sun gear member 153.

The multi-speed transmission 112 includes a first clutch C1 selectively engageable to connect the second sun gear member 153 for common rotation with the input member 114 and the second motor/generator 18B. The multi-speed transmission 112 includes a first brake B1 selectively engageable to ground the first sun gear member 152 to the stationary member 30. A second brake B2 is selectively engageable to ground the second sun gear member 153 to the stationary member 30. The first clutch C1, the first brake B1, and the second brake B2 are separately selectively engaged by applying hydraulic pressure via the hydraulic pump 48 under control of the controller 40 or under control of a different controller connected with the controller 40 to establish three different fixed forward speed ratios between the input member 114 and the output member 116. The clutch C1 and brakes B1, B2 are referred to as selectively engageable torque-transmitting mechanisms.

Figures 3, 4:
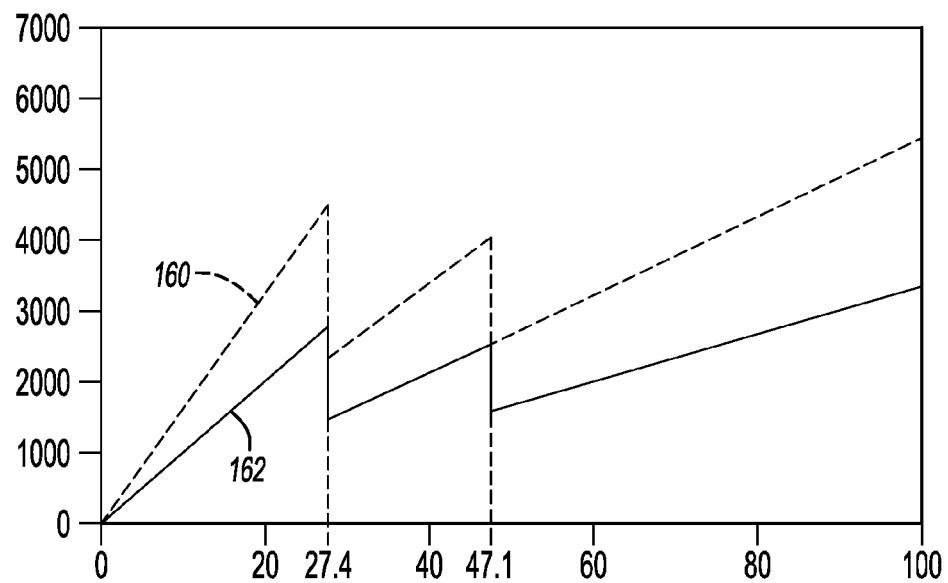
FIG. 3 is a table indicating an engagement schedule of torque-transmitting mechanisms of the multi-speed transmission of FIG. 2 to establish multiple fixed speed ratios.
FIG. 4 is a plot of the speed of one of the motor/generators of FIG. 2 versus vehicle speed when the hybrid powertrain is installed on a vehicle and the multiple fixed speed ratios are established.

Specifically, referring to FIG. 3, three forward fixed speed ratios 1, 2, and 3 are established when the second brake B2, the first clutch C1, and the first brake B1 are engaged, in that order, to establish an underdrive speed ratio of 1.926, a direct drive speed ratio of 1.000, and an underdrive speed ratio of 0.634 between the input member 114 and the output member 116. An "X" in the chart of FIG. 3 indicates an engaged state of the respective torque-transmitting mechanism. If no "X" is present, the respective torque-transmitting mechanism is not engaged. These example numerical ratios are achieved when the ring gear member 154 has 104 teeth, the first sun gear member 152 has 60 teeth, the second sun gear member 153 has 50 teeth, the pinions 157 each have 22 teeth and the pinions 158 each have 27 teeth. Ratio steps between the first fixed forward speed ratio 2 and the second fixed forward speed ratio 3 are 1.93 and 1.58, respectively, and the overall ratio spread of the transmission 112 from the first forward fixed speed ratio 1 to the third forward fixed speed ratio 3 is 3.037. Other speed ratios, ratio steps, and overall ratio spreads are achieved with other tooth counts.

FIG. 3 also indicates that three reverse fixed speed ratios R1, R2, R3 are available between the input member 114 and the output member 116 according to the same engagement schedule as is used to establish the three forward fixed speed ratios 1, 2, 3. The three reverse fixed speed ratios are established by controlling the motor/generator 18B so that the rotor 26B rotates in a direction of rotation opposite the direction that it rotates in the forward fixed speed ratios.

FIG. 4 shows the effect that the available fixed speed ratios have on the speed of the motor/generator 18B in revolutions per minute (rpm) as the speed in miles per hour (mph) of a vehicle on which the powertrain 112 is installed increases. The plot 160 is the speed of the rotor 26B of the motor/generator 18B, such as in the electric-only operating mode, with a first final drive ratio of a final drive, not shown, connected between the output member 116 and vehicle wheels of a predetermined radius. At a vehicle speed of 27.4 miles per hour, the second brake B2 is disengaged and the first clutch C1 is engaged to shift from the first forward fixed speed ratio 1 of FIG. 3 to the second forward fixed speed ratio 2. The speed of the motor/generator 18B increases to about 4500 rpm as vehicle speed increases during the first forward fixed ratio 1, and then drops to about 2337 rpm when the transmission 112 is shifted to the second forward fixed speed ratio. The speed of the motor/generator 18B then increases to about 4050 rpm until the transmission 112 is shifted to the third forward fixed speed ratio 3 at about 47.1 mph. The speed of the motor/generator 18B then drops to about 2568 rpm before increasing gradually as vehicle speed increases.

The plot 162 in FIG. 4 is the speed of the rotor 26B of the motor/generator 18B as the speed of the vehicle on which the powertrain 112 is installed increases, assuming that a different final drive is installed on the vehicle between the output member 116 and the vehicle wheels. The final drive has a greater ratio of speed of an output of the final drive to speed of the output member 116 of the transmission 112, and thus permits the output member 116 and the motor/generator 18B to rotate at a lower speed than with the final drive used in a vehicle in which the speed of the motor/generator 18B is reflected by plot 160.

Both plots 160 and 162 illustrate the ability of the fixed forward speed ratios of the multi-speed transmission 112 having an input member 114 connected for rotation with the rotor 26B to reduce the speed of the motor/generator 18B as upshifts occur. This allows the motor/generator 18B to be operated in speed and torque ranges in which the motor/generator 18B is more efficient. Increased efficiency of the motor/generator 18B could allow the motor/generator 18B to be relatively small in size and could extend the operation of the powertrain 112 in the electric-only operating mode.

It should be appreciated that the prime mover 22, the motor/generator 18A, the motor/generator 18B and the damping mechanism 35 of the hybrid powertrain 112 can be controlled as described with respect to the hybrid powertrain 10 of FIG. 1 to provide the hybrid series operating mode, the hybrid parallel operating mode, the prime mover-only operating modes, the electric-only operating mode, and the regenerative braking operating mode as described with respect to the hybrid powertrain of FIG. 1. In each of these operating modes, the fixed forward speed ratios of the transmission 112 can be provided to enable the speed of rotation of the rotor 26B to be reduced as upshifts occur, as described with respect to FIG. 4.

Figure 5:
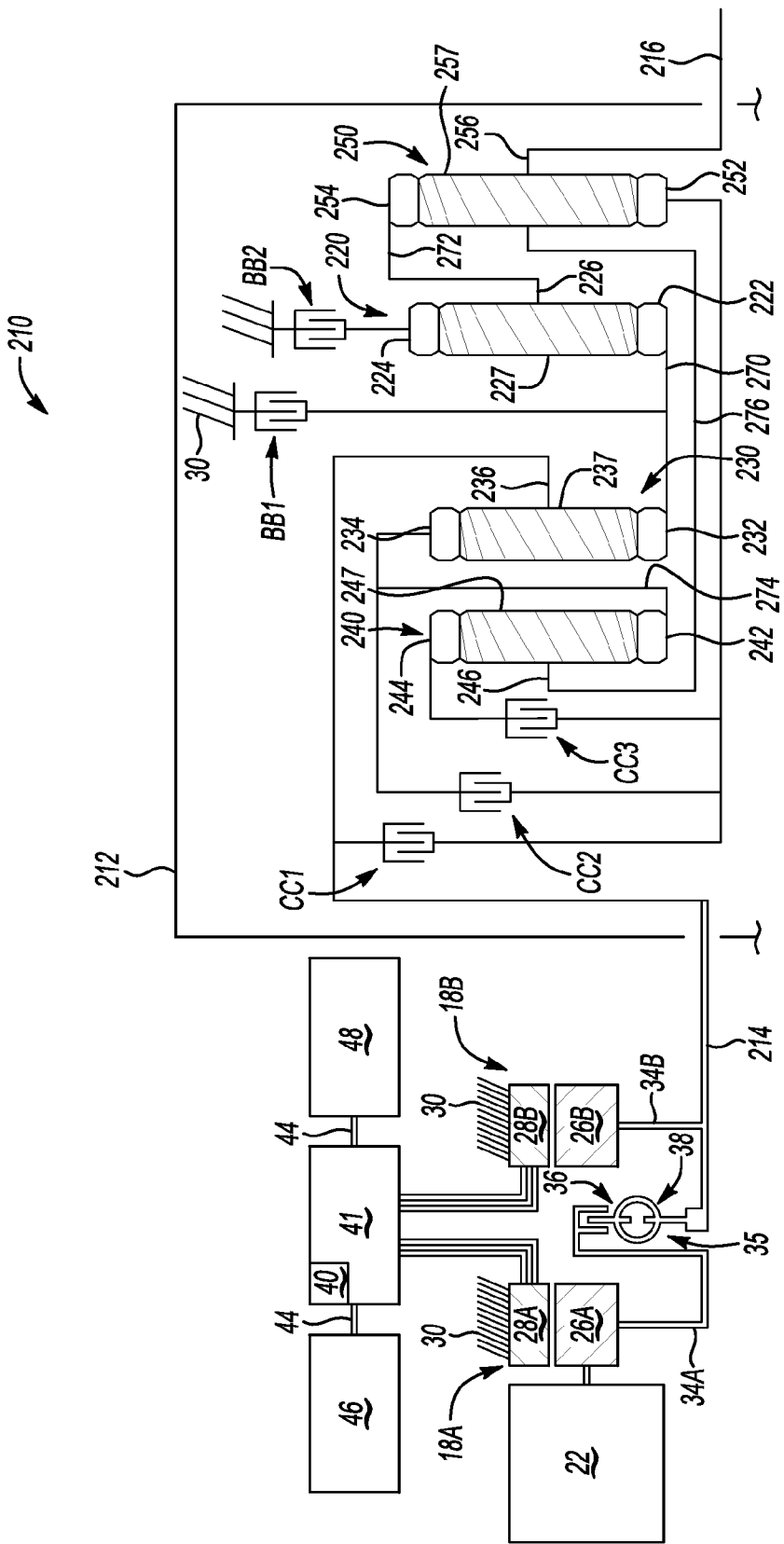
FIG. 5 is a schematic illustration in partial cross-sectional view of a hybrid powertrain including a multi-speed transmission in accordance with another alternative aspect of the present teachings.

FIG. 5 shows another hybrid powertrain 210 within the scope of the present teachings. Components in the hybrid powertrain 210 that are identical to those of the hybrid powertrain 10 are indicated with like reference numbers. In the hybrid powertrain 210, a multi-speed transmission 212 includes an input member 214 connected for common rotation with the rotor 26B via rotor hub 34B. The multi-speed transmission 212 includes a first planetary gear set 220, a second planetary gear set 230, a third planetary gear set 240 and a fourth planetary gear set 250. The planetary gear set 220 has a sun gear member 222, a ring gear member 224, and a carrier member 226 that rotatably supports pinion gears 227 that mesh with the sun gear member 222 and the ring gear member 224. The planetary gear set 230 has a sun gear member 232, a ring gear member 234, and a carrier member 236 that rotatably supports pinion gears 237 that mesh with the sun gear member 232 and the ring gear member 234. The planetary gear set 240 has a sun gear member 242, a ring gear member 244, and a carrier member 246 that rotatably supports pinion gears 247 that mesh with the sun gear member 242 and the ring gear member 244. The planetary gear set 250 has a sun gear member 252, a ring gear member 254, and a carrier member 256 that rotatably supports pinion gears 257 that mesh with the sun gear member 252 and the ring gear member 254.

The transmission 212 has a first interconnecting member 270 continuously connecting the sun gear member 222 of the first planetary gear set 220 for common rotation with the sun gear member 232 of the second planetary gear set 230. The transmission 212 has a second interconnecting member 272 continuously connecting the carrier member 226 of the first planetary gear set 220 for common rotation with the ring gear member 254 of the fourth planetary gear set 250. The transmission 212 has a third interconnecting member 274 continuously connecting the sun gear member 242 of the third planetary gear set 240 for common rotation with the ring gear member 234 of the second planetary gear set 230. The transmission 212 has a fourth interconnecting member 276 continuously connecting the carrier member 246 of the third planetary gear set 240 for common rotation with the carrier member 256 of the fourth planetary gear set 250. The input member 214 is connected for common rotation with the carrier member 236 of the second planetary gear set 230. An output member 216 is connected for common rotation with the carrier member 256 of the fourth planetary gear set 250.

The transmission 212 has five selectively engageable torque-transmitting mechanisms, including a first brake BB1, a second brake BB2, a first clutch CC1, a second clutch CC2, and a third clutch CC3. The first brake BB1 is selectively engageable to ground the sun gear members 222, 232 of the first and the second planetary gear sets 220, 230 to a stationary member 30, such as a casing of the transmission 212. The second brake BB2 is selectively engageable to ground the ring gear member 224 of the first planetary gear set 220 to the stationary member 30 which may be the transmission casing. A first clutch CC1 is selectively engageable to connect the input member 214 for common rotation with the sun gear member 252 of the fourth planetary gear set 250. The second clutch CC2 is selectively engageable to connect the ring gear member 234 of the second planetary gear set 230 for common rotation with the sun gear member 252 of the fourth planetary gear set 250. The third clutch CC3 is selectively engageable to connect the ring gear member 244 of the third planetary gear set 240 for common rotation with the sun gear member 252 of the fourth planetary gear set 250.

Figures 6, 7:
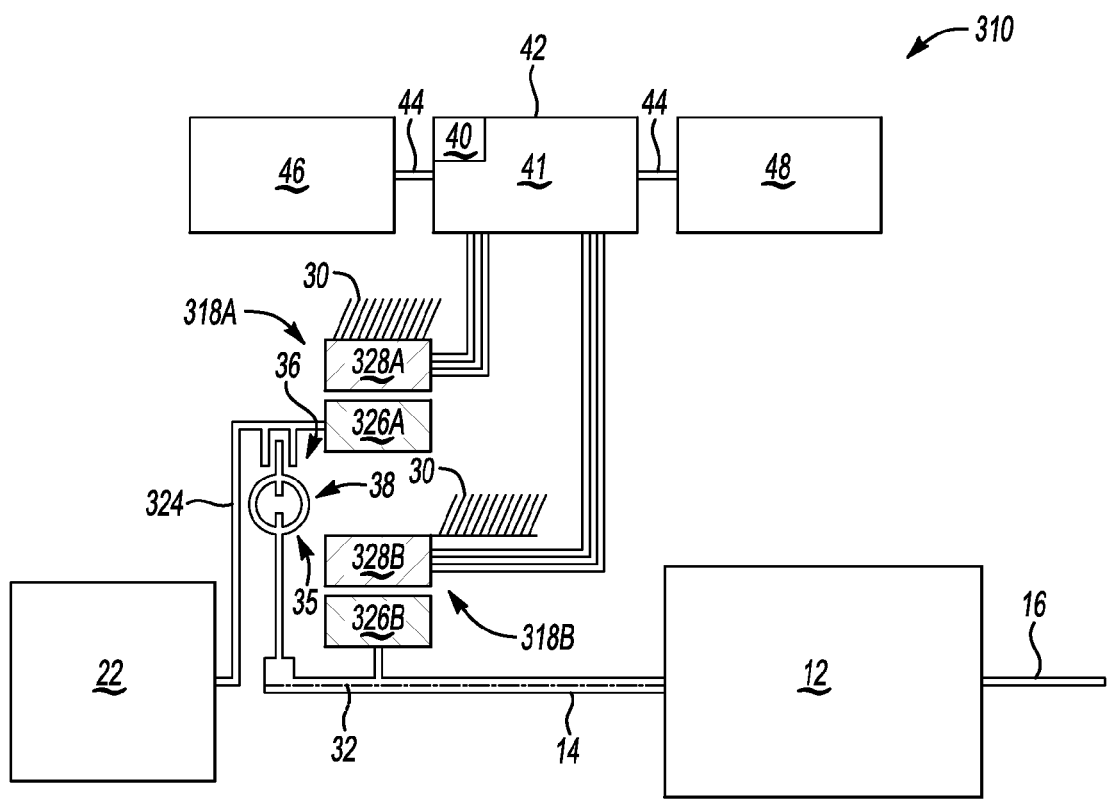
FIG. 6 is a table indicating an engagement schedule of torque-transmitting mechanisms of the multi-speed transmission of FIG. 5 to establish multiple fixed speed ratios.
FIG. 7 is a schematic illustration in partial cross-sectional view of a hybrid powertrain including a multi-speed transmission in accordance with another alternative aspect of the present teachings.

The brakes BB1, BB2 and the clutches CC1, CC2, CC3 are selectively engaged in different combinations of three as indicated in the chart of FIG. 6 to provide eight forward speed ratios 1-8 of the input member 214 to the output member 216 and a reverse speed ratio R of the input member 214 to the output member 216. An "X" in the chart of FIG. 6 indicates an engaged state of the respective torque-transmitting mechanism. If no "X" is present, the respective torque-transmitting mechanism is not engaged. The numerical values of the speed ratios 1-8 are dependent on the specific tooth counts of the ring gear members 224, 234, 244, 254 and the sun gear members 222, 232, 242, and 252 of the planetary gear sets 220, 230, 240 and 250. A person of skill in the art will understand from the engagement schedule of FIG. 6 that eight different fixed forward speed ratios and a fixed reverse speed ratio will result from the clutch engagement combinations shown.

In the electric-only operating mode, the motor-generator 18B can be controlled to rotate in a direction of rotation opposite the direction that it rotates when the fixed forward speed ratios are provided through the transmission 212. Accordingly, eight additional reverse operating states having the same magnitude as the fixed forward speed ratios can be achieved by the hybrid powertrain 212, in addition to the fixed reverse ratio R.

It should be appreciated that the prime mover 22, the motor/generator 18A, the motor/generator 18B and the damping clutch 36 of the hybrid powertrain 212 can be controlled as described with respect to the hybrid powertrain 10 of FIG. 1 to provide the hybrid series operating mode, the hybrid parallel operating mode, the prime mover-only operating mode, the electric-only operating mode, and the regenerative braking operating modes as described with respect to the hybrid powertrain of FIG. 1. In each of these operating modes, the fixed speed ratios of the transmission 212 can be provided to enable the speed of rotation of the rotor 26B to be reduced as upshifts occur, similar to the effect described with respect to FIG. 4.

FIG. 7 shows another embodiment of a hybrid powertrain 310. The hybrid powertrain 310 has many of the same components as the hybrid powertrain 10 of FIG. 1, and is operable to achieve all of the operating modes described with respect to the powertrain 10. The hybrid powertrain 310 has a first motor/generator 318A and a second motor/generator 318B that are concentric, with the second motor/generator 318B radially surrounded by the first motor/generator 318A. That is, the motor/generators 318A, 318B are radially stacked around the axis of rotation 32 in the order of a rotor 326B of the motor/generator 318B, a stator 328B of the motor/generator 318B, a rotor 326A of the motor/generator 318A, and a stator 328A of the motor/generator 318A. Both of the stators 328A, 328B are grounded to the same or a different stationary member 30. A drive member 324 of the prime mover 22 includes a hub that extends radially outward to connect with the rotor 326A. Engagement of the damper clutch 36 connects the drive member 324 of the prime mover 22 and the rotor 326A for common rotation with the input member 14 and the rotor 326B.

The hybrid powertrain 310 is operable to provide the hybrid series operating mode, the hybrid parallel operating mode, the prime mover-only operating mode, the electric-only operating mode, and the regenerative braking operating modes as described with respect to the hybrid powertrain 10 of FIG. 1, with the motor/generator 318A controlled as described with respect to the motor/generator 18A and the motor/generator 318B controlled as described with respect to the motor/generator 18B. While the best modes for carrying out the many aspects of the present teachings have been described in detail, those familiar with the art to which these teachings relate will recognize various alternative aspects for practicing the present teachings that are within the scope of the appended claims.

The invention claimed is:
1. A hybrid powertrain comprising:
a prime mover having a drive member;
a multi-speed transmission having an input member and an output member;
a first motor/generator continuously connected for common rotation with the drive member;
a second motor/generator continuously connected for common rotation with the input member;
a damper connected with the input member;
a damper clutch selectively engageable to connect the first motor/generator and the drive member for common rotation with the second motor/generator and the input member through the damper;
a controller operatively connected to the motor/generators and the damper clutch and configured to establish:

a hybrid series operating mode when the prime mover is on, the damper clutch is disengaged, the first motor/generator is controlled to function as a generator, and the second motor/generator is controlled to function as a motor; and a hybrid parallel operating mode when the prime mover is on, the damper clutch is engaged, and the first and second motor/generators are controlled to function as motors.

2. The hybrid powertrain of claim 1, wherein the controller is configured to establish an electric-only operating mode when the damper clutch is disengaged, the prime mover and the first motor/generator are off, and the second motor/generator is controlled to function as a motor.

3. The hybrid powertrain of claim 2, wherein the multi-speed transmission is operable to establish a reverse speed ratio between the input member and the output member;

wherein the controller is configured to establish a prime mover-only operating mode when the damper clutch is engaged, the prime mover is on, and the motor/generators are off; and wherein the reverse speed ratio is established in any one of the hybrid series operating mode, the hybrid parallel operating mode, the electric-only operating mode, and the engine-only operating mode.

4. The hybrid powertrain of claim 1, wherein the controller is configured to establish a regenerative braking mode when the damper clutch is engaged and at least one of the motor/generators is controlled to function as a generator to slow rotation of the input member.

5. The hybrid powertrain of claim 1, wherein the first motor/generator is coaxial with the second motor/generator.

6. The hybrid powertrain of claim 1, wherein the second motor/generator is concentric with and radially surrounded by the first motor/generator.

7. The hybrid powertrain of claim 1, wherein the multi-speed transmission includes:

a Ravigneaux gear set that has a ring gear member connected for common rotation with the output member, a first sun gear member, a second sun gear member, and a carrier member connected for common rotation with the input member and rotatably supporting a first set of pinions and a second set of pinions;

wherein the first set of pinions meshes with the ring gear member and the first sun gear member; wherein the second set of pinions meshes with the first set of pinions and the second sun gear member;

a first clutch selectively engageable to connect the second sun gear member for common rotation with the input member and the second motor/generator;

a first brake selectively engageable to ground the first sun gear member to a stationary member;

a second brake selectively engageable to ground the second sun gear member to the stationary member; and wherein the first clutch, the first brake, and the second brake are separately selectively engaged to establish three different fixed forward speed ratios between the input member and the output member.

8. The hybrid powertrain of claim 7, wherein three different fixed reverse speed ratios equal in magnitude to the three different fixed forward speed ratios are established when the second motor/generator is controlled to rotate in a direction opposite a direction that the second motor/generator rotates during the three different fixed forward speed ratios.

9. The hybrid powertrain of claim 7, wherein the controller establishes either of:

the hybrid series operating mode; and an electric-only operating mode with the damper clutch disengaged, the prime mover off and the first motor/generator off;

while the second motor/generator is controlled to function as a motor to rotate in a direction opposite a direction that the second motor/generator rotates during the three different fixed forward speed ratios.

10. The hybrid powertrain of claim 1, wherein the controller is configured to establish a regenerative braking mode when the damper clutch is disengaged and the second motor/generator is configured to function as a generator.

11. The hybrid powertrain of claim 1, wherein the multi-speed transmission includes:

a first, a second, a third, and a fourth planetary gear set, each having a sun gear member, a ring gear member, a carrier member, and pinion gears rotatably supported by the carrier member and meshing with the sun gear member and the ring gear member;

a first interconnecting member continuously connecting the sun gear member of the first planetary gear set for common rotation with the sun gear member of the second planetary gear set;

a second interconnecting member continuously connecting the carrier member of the first planetary gear set for common rotation with the ring gear member of the fourth planetary gear set;

a third interconnecting member continuously connecting the sun gear member of the third planetary gear set for common rotation with the ring gear member of the second planetary gear set;

a fourth interconnecting member continuously connecting the carrier member of the third planetary gear set for common rotation with the carrier member of the fourth planetary gear set; wherein the input member is connected for common rotation with the carrier member of the second planetary gear set; wherein the output member is connected for common rotation with the carrier member of the fourth planetary gear set;

a first brake selectively engageable to ground the sun gear members of the first and the second planetary gear sets to a stationary member;

a second brake selectively engageable to ground the ring gear member of the first planetary gear set to the stationary member;

a first clutch selectively engageable to connect the input member for common rotation with the sun gear member of the fourth planetary gear set;

a second clutch selectively engageable to connect the ring gear member of the second planetary gear set for common rotation with the sun gear member of the fourth planetary gear set;

a third clutch selectively engageable to connect the ring gear member of the third planetary gear set for common rotation with the sun gear member of the fourth planetary gear set; and wherein the brakes and the clutches are selectively engaged in different combinations of three to provide eight fixed forward speed ratios of the input member to the output member and a fixed reverse speed ratio of the input member to the output member.

12. A hybrid powertrain comprising:

an engine having a drive member;

a multi-speed transmission having an input member and an output member and multiple torque-transmitting mechanisms selectively engageable in different combinations of one or more to provide multiple fixed speed ratios between the input member and the output member;

a first motor/generator continuously connected for common rotation with the drive member;

a second motor/generator continuously connected for common rotation with the input member;

a damper connected with the input member;

a damper clutch selectively engageable to connect the first motor/generator and the drive member for common rotation with the second motor/generator and the input member through the damper;

a controller operatively connected to the motor/generators and the damper clutch and configured to establish:

a hybrid series operating mode when the prime mover is on, the damper clutch is disengaged, the first motor/generator is controlled to function as a generator, and the second motor/generator is controlled to function as a motor;

a hybrid parallel operating mode when the prime mover is on, the damper clutch is engaged, and the first and second motor/generators are controlled to function as motors; and wherein the torque-transmitting mechanisms of the multi-speed transmission are controlled to establish the multiple fixed speed ratios during at least one of the hybrid series operating mode and the hybrid parallel operating mode so that a speed of rotation of the second motor/generator decreases when a lower one of the fixed speed ratios between the input member and the output member is established.

13. The hybrid powertrain of claim 12, wherein the controller is configured to establish an electric-only operating mode when the damper clutch is disengaged, the engine and the first motor/generator are off, and the second motor/generator is controlled to function as a motor.

14. The hybrid powertrain of claim 13, wherein the multi-speed transmission is operable to provide a fixed reverse speed ratio between the input member and the output member;

wherein the controller is configured to establish an engine-only operating mode when the damper clutch is engaged, the engine is on, and the motor/generators are off; and wherein the fixed reverse speed ratio is established in any one of the hybrid series operating mode, the hybrid parallel operating mode, the electric-only operating mode, and the engine-only operating mode.

15. The hybrid powertrain of claim 12, wherein the controller is configured to provide a regenerative braking mode when the damper clutch is engaged and at least one of the motor/generators is controlled to function as a generator to slow rotation of the input member; and wherein the controller is configured to provide another regenerative braking mode when the damper clutch is disengaged and the second motor/generator is configured to function as a generator.

16. The hybrid powertrain of claim 11, wherein the second motor/generator is concentric with and radially surrounded by the first motor/generator.

17. The hybrid powertrain of claim 11, wherein the multi-speed transmission includes:

a Ravigneaux gear set that has a ring gear member connected for common rotation with the output member, a first sun gear member, a second sun gear member, and a carrier member connected for common rotation with the input member and rotatably supporting a first set of pinions and a second set of pinions;

wherein the first set of pinions meshes with the ring gear member and the first sun gear member; wherein the second set of pinions meshes with the first set of pinions and the second sun gear member;

a first clutch selectively engageable to connect the second sun gear member for common rotation with the input member and the second motor/generator;

a first brake selectively engageable to ground the first sun gear member to a stationary member;

a second brake selectively engageable to ground the second sun gear member to the stationary member; and wherein the first clutch, the first brake, and the second brake are separately selectively engaged to establish three different fixed forward speed ratios between the input member and the output member.

18. The hybrid powertrain of claim 17, wherein three different fixed reverse speed ratios equal in magnitude to the three different fixed forward speed ratios are established when the second motor/generator is controlled to rotate in a direction opposite a direction that the second motor/generator rotates during the three different fixed forward speed ratios.

19. The hybrid powertrain of claim 17, wherein the controller establishes either of:

the hybrid series operating mode; and an electric-only operating mode with the damper clutch disengaged, the engine off and the first motor/generator off;

while the second motor/generator is controlled to function as a motor to rotate in a direction opposite a direction that the second motor/generator rotates during the three different fixed forward speed ratios.

20. The hybrid powertrain of claim 11, wherein the multi-speed transmission includes:

a first, a second, a third, and a fourth planetary gear set, each having a sun gear member, a ring gear member, a carrier member, and pinion gears rotatably supported by the carrier member and meshing with the sun gear member and the ring gear member;

a first interconnecting member continuously connecting the sun gear member of the first planetary gear set for common rotation with the sun gear member of the second planetary gear set;

a second interconnecting member continuously connecting the carrier member of the first planetary gear set for common rotation with the ring gear member of the fourth planetary gear set;

a third interconnecting member continuously connecting the sun gear member of the third planetary gear set for common rotation with the ring gear member of the second planetary gear set;

a fourth interconnecting member continuously connecting the carrier member of the third planetary gear set for common rotation with the carrier member of the fourth planetary gear set; wherein the input member is connected for common rotation with the carrier member of the second planetary gear set; wherein the output member is connected for common rotation with the carrier member of the fourth planetary gear set;

a first brake selectively engageable to ground the sun gear members of the first and the second planetary gear sets to a stationary member;

a second brake selectively engageable to ground the ring gear member of the first planetary gear set to the stationary member;

a first clutch selectively engageable to connect the input member for common rotation with the sun gear member of the fourth planetary gear set;

a second clutch selectively engageable to connect the ring gear member of the second planetary gear set for common rotation with the sun gear member of the fourth planetary gear set;

a third clutch selectively engageable to connect the ring gear member of the third planetary gear set for common rotation with the sun gear member of the fourth planetary gear set; and wherein the brakes and the clutches are selectively engaged in different combinations of three to provide eight fixed forward speed ratios of the input member to the output member and a fixed reverse speed ratio of the input member to the output member.

* * * * *